United States Patent [19]

Thorssen et al.

[11] Patent Number: 5,207,953
[45] Date of Patent: May 4, 1993

[54] FIRE RETARDED SOLVENTS

[75] Inventors: Donald A. Thorssen; Dwight N. Loree, both of Calgary, Canada

[73] Assignee: Trisol Inc., Calgary, Canada

[21] Appl. No.: 800,475

[22] Filed: Nov. 27, 1991

[51] Int. Cl.$^5$ .................. C09K 21/08; C09K 7/06; C23G 5/028
[52] U.S. Cl. ..................... 252/601; 252/602; 252/364; 252/8.551
[58] Field of Search ................ 252/601, 602, 364

[56] References Cited

U.S. PATENT DOCUMENTS

| | | | |
|---|---|---|---|
| 2,217,926 | 10/1940 | VanCampen | 255/1 |
| 2,297,660 | 9/1942 | Mazee | 252/8.5 |
| 2,805,722 | 9/1957 | Morgan et al. | 166/35 |
| 2,894,584 | 7/1959 | Birdwell et al. | 166/42 |
| 2,898,294 | 8/1959 | Priest et al. | 252/8.55 |
| 3,151,992 | 10/1964 | Blair | 106/15 |
| 3,288,216 | 11/1966 | Blickensderfer et al. | 166/42 |
| 3,496,107 | 2/1970 | Lima | 252/49.9 |
| 3,712,393 | 1/1973 | Sheldahl et al. | 176/65 |
| 3,730,898 | 5/1973 | McCord | 252/78 |

(List continued on next page.)

FOREIGN PATENT DOCUMENTS

| | | |
|---|---|---|
| 815001 | 6/1969 | Canada . |
| 860314 | 1/1971 | Canada . |
| 1002530 | 12/1976 | Canada . |
| 1115054 | 12/1981 | Canada . |
| 1175037 | 9/1984 | Canada . |
| 1209569 | 8/1986 | Canada . |
| 1234352 | 3/1988 | Canada . |
| 1274380 | 9/1990 | Canada . |

OTHER PUBLICATIONS

Halon Fire Extinguishing Agents Technical Options Report, purusant to Article 6 of the Montreal Protocol on substances that deplete the ozone layer, Jun. 30, 1989.

Report of the Technology Review Panel, pursuant to Article 6 of the Montreal Protocol on substances that deplete the ozone layer, Jun. 30, 1989.
Paper No. 86-37-27 of the Petroleum Society of CIM, "Improved Well Productivity Realized by Fracturing with FRAC OIL as Compared to Diesel", 1986.
Brochure on Super Frac available from Home Oil, Calgary, Alberta.
Improving Oil Well Stimulations with Compatible Oils, Hassen et al., Journal of Canadian Petroleum Technology, 1986, Montreal.
Technical Bulletin, Gulf Arosol HTU, Gulf Canada Limited.
Brochure describing FRAC OIL products of Home Oil Limited.

Primary Examiner—Richard D. Lovering
Assistant Examiner—Joseph D. Anthony
Attorney, Agent, or Firm—Christensen, O'Connor, Johnson & Kindness

[57] ABSTRACT

A fire retarded solvent composition includes a mixture of at least one flammable organic solvent; and a mixture of at least one brominated hydrocarbon, in an amount sufficient to decrease the flame propagation rate of the composition and preferably increase the flash point of the solvent composition. The brominated hydrocarbon may be selected from the group consisting of dibromoethane, dibromomethane, chlorodibromomethane, bromochloromethane, dibromodifluoromethane, dibromodifluoroethane, 1,2,dibromo-1,1-difluoroethane, chlorodibromofluoromethane, 1,2dibromotetrafluoroethane and 1,2dibromoethylene. Dibromomethane and bromochloromethane are preferred. When used as an oil and gas operation fluid, the fluorinated hydrocarbons should not be used, nor should the brominated hydrocarbon be an aromatic or contain an oxygen bridge. The organic solvent is preferably selected from the group consisting of light petroleum distillate, diesel and crude, the fluid hydrocarbon primarily having between 5 and 12 carbon atoms.

13 Claims, No Drawings

U.S. PATENT DOCUMENTS

| | | | |
|---|---|---|---|
| 3,773,677 | 11/1973 | Boyles | 252/172 |
| 3,827,978 | 8/1974 | Miles | 252/8.55 R |
| 3,933,669 | 1/1976 | Fowlkes et al. | 252/78 |
| 3,974,116 | 8/1976 | Lissant | 260/29.2 UA |
| 4,001,129 | 1/1977 | Sheratte | 252/78.5 |
| 4,083,698 | 4/1978 | Wenzel et al. | 44/51 |
| 4,101,425 | 7/1978 | Young et al. | 252/8.553 |
| 4,153,066 | 5/1979 | Griffin, Jr. | 137/13 |
| 4,174,283 | 11/1979 | Griffith, Jr. | 252/8.551 |
| 4,387,016 | 6/1983 | Gagon | 208/11 LE |
| 4,593,764 | 6/1986 | Lilienthal | 166/312 |
| 4,645,615 | 2/1987 | Drake | 252/78.5 |
| 4,663,027 | 5/1987 | Mendiratta et al. | 208/262 |
| 4,775,489 | 10/1988 | Watkins | 252/8.552 |
| 4,839,096 | 6/1989 | Dennis et al. | 252/8.515 |
| 4,865,129 | 9/1989 | Ryles | 166/295 |
| 4,900,456 | 2/1990 | Ogilvy | 252/8.551 |
| 4,902,310 | 2/1990 | Vara et al. | 55/46 |
| 5,102,557 | 4/1992 | Nimitz et al. | 252/8 |

FIRE RETARDED SOLVENTS

TECHNICAL FIELD

The present invention relates to solvents, particularly hydrocarbon solvents, and which may be used particularly as oil and gas well site operation fluid compositions or as industrial solvents, and to a method of fire retarding such solvents.

BACKGROUND OF THE INVENTION

Many industrial and household organic solvents such as hydrocarbon solvents manufactured under the trademark VARSOL of Imperial Oil, Calgary, Canada, or such as turpentine, are made of petroleum distillates and are frequently flammable. This evidently creates a hazard, particularly when these solvents are used in oil and gas exploration as well site operation fluids. Such well site operation fluids are pumped down the well, often under high pressure, and are frequently used in the vicinity of equipment with high temperature components, such as exhaust pipes. The use of flammable organic solvents in these conditions and during transportation evidently presents a hazard.

In particular, when light petroleum distillates (having primarily between 5 and 12 carbon atoms) are used for fracturing a well formation, the very high pressures used can create a fire hazard. For example, among frac oils used in industry, the following products of Dome Petroleum Limited of Calgary, Alberta have densities (in kg/m$^3$ at 15° C.) and flash points (flash points are Pensky Martens throughout this patent disclosure) indicated: FRAC OIL 120 ... 780, 10° C.; FRAC OIL 200 ... 785, 20° C.; FRAC OIL 300 ... 800, −3° C.; FRAC OIL 500 ... 798, 15° C. SUPER FRAC™ made by Home Oil Company Limited of Calgary, Alberta has a flash point of 15° C. and density of 778. Diesel P-40 has a flash point of 43° C. and density of 820. These fluids are being actively used as frac oils and the present invention is believed to have utility for fire retarding them, and other similar flammable organic solvents.

Substitution of other fluids for the volatile hydrocarbons, or alteration of these fluids to make them non-flammable, cannot be reliably predicted to work in part because of formation compatibility.

SUMMARY OF THE INVENTION

The inventors have proposed a way of fire retarding flammable and combustible organic solvents such as the lighter hydrocarbons particularly for use in wellsite operations, but also for use as industrial or household solvents with low volume percentages of additive. These fluids are non-aqueous.

The inventors have therefore proposed in one aspect of the invention a fire retarded solvent composition for use as an oil and gas operation fluid, the composition comprising at least one formation compatible combustible organic solvent; and at least one brominated non-aromatic hydrocarbon dissolved in the organic solvent in an amount sufficient to cause a decrease in the flame propagation rate of the solvent composition.

The inventors found, moreover, that the fire retarded organic solvents thus produced were compatible with most formations and would be superior to existing drilling and service fluids.

In another aspect of the invention the inventors have proposed a fire retarded solvent composition for use as an industrial or household solvent, the composition comprising at least one flammable organic solvent; and at least one brominated hydrocarbon dissolved in the organic solvent in an amount sufficient to cause a decrease in the flame propagation rate of the solvent composition.

In a still further aspect of the invention there is proposed a method of fire retarding a flammable organic solvent to create a fire retarded organic solvent, the method comprising the step of dissolving in the flammable organic solvent a mixture of at least one brominated hydrocarbon in an amount sufficient to decrease the flame propagation rate of the organic solvent.

DETAILED DESCRIPTION OF THE PREFERRED EMBODIMENTS

The brominated hydrocarbon should be selected to allow sufficient concentration of additive in the vapour phase to result in a decrease in the flame propagation rate of the composition and preferably increase the flash point and fire point of the composition.

The preferred organic solvents for use as formation compatible oil and gas well site operation fluids (sometimes referred to as operation fluids) typically comprise combustible or flammable fluid hydrocarbons such as light petroleum distillates (condensates), diesel and crude oil, these being hydrocarbons having between 5 and 12 carbon atoms (C5–C12) and traces of hydrocarbons having up to 30+ carbon atoms. The preferred cut is about 100° C. and greater. A good example is the Sundre C5+ condensate available from Trysol Inc. of Calgary, Alberta, Canada distilled to 110° C. It includes the following constituents (with volume fraction in parentheses as determined by gas chromatography): heptanes (0.0072), octanes (0.1191), nonanes (0.1028), decanes (0.1143), undecanes (0.0927), dodecanes (0.0687), tridecanes (0.0598), tetradecanes (0.0449), pentadecanes (0.0366) and smaller quantities of C$_{16}$+ alkanes, as well as smaller quantities of toluene (0.0131), benzene and xylene (ethylbenzene, p+m-xylene 0.0371, o-xylene 0.0156, 1,2,4 trimethylbenzene 0.0158). However, actual aromatic content is believed to be about 35% (the gas chromatography does not distinguish between some aromatics and alkanes). The preferred organic solvent primarily includes a mixture of alkanes and aromatics.

These organic solvents typically have a specific gravity of about 0.8, so that when mixed with no more than about 5% by volume of halogenated hydrocarbon as described in this disclosure, the fire retarded solvent will typically have a specific gravity of less than 0.9. Thus, fluid condensate (98° C. cut, s.g. .7950) may be mixed with up to 5% dibromomethane (b.p. 96°–98° C.) to produce an organic solvent with a specific gravity of up to 0.8794. Fluid condensates with which the mixture of brominated hydrocarbon may be added to improve fire retardancy include C4 condensate from the Coleman field in Alberta, Canada, with s.g. of 0.800, or C6+ condensate from the Harmattan Area Gas Plant in Alberta, Canada, with s.g. of about 0.765. Useful flammable organic solvents include hydrocarbon solvents manufactured under the trademark VARSOL of Imperial Oil Canada.

When the flammable organic solvent is used in well site operations, it is preferred that the organic solvent include toluene, ethylbenzene, para-xylene, meta-xylene, ortho-xylene as well as other mono-, di- and tri-aromatics to assist in solvating waxes and asphaltenes. In particular, if a particular condensate from a refinery is found after analysis and testing to assist in asphaltene precipitation, then xylene (preferably from a 130° C. to 145° C. cut) may be added to ensure compatibility of the organic solvent with the reservoir. The xylene may be obtained by removing a xylene rich cut from for example the Sundre feed stock described above and further distilling it to produce a cut that is richer in xylene. It is desirable to ensure that the percentage of aromatics in the solvent be kept above about 30% since otherwise there is increasing danger of asphaltene precipitation.

Other organic solvents for use in wells should be formation compatible and include hydrocarbon derivatives such as alcohols, ketones, esters, ethers, and terpenes.

Due to restrictions on the commercial use of fully brominated hydrocarbons, these are not believed to have utility in all places and at all times, and thus the emphasis in this patent disclosure is on the properties of partially brominated hydrocarbons whose utility is believed to be of greatest use in the compositions and methods of the invention. Nonetheless, the fire retardant properties of fully brominated hydrocarbons are desirable properties so that where permitted by law they might be used. Also, other brominated hydrocarbons can be highly toxic, thus for example, it is not recommended to use bromomethane. Brominated hydrocarbons in particular have surprising utility when used in or as a formation compatible oil and gas well site operation fluid. The bromines provide good fire retardance in small quantities. Bromochloromethane may be used as the brominated hydrocarbon, and the addition of the chlorine, by lowering the boiling point of the additive, is believed to assist in the fire retardant properties of the composition.

Other halogens may have utility in some circumstances, but they are presently expensive to manufacture and therefore are not preferred. Dibromomethane is believed to be preferred. Test results show a desirable composition would include about up to 5% of dibromomethane when added to a 98° C. cut fluid condensate, yielding a specific gravity up to 0.8794.

Other brominated hydrocarbons believed to have utility as good fire retardants, while being formation compatible, include dibromoethane (s.g. 2.18, b.p. 131°-132° C.), chlorodibromomethane (s.g. 2.451, b.p. 119°-120° C.), bromochloromethane (s.g. 1.991, b.p. 68° C.), and 1,2dibromoethylene (s.g. 2.246, b.p. 110° C.). Alkanes are believed to be most useful because they may be economically produced. Further, for oil and gas operations it is believed to be inadvisable to use brominated aromatics, particularly aromatics with an oxygen bridge, since where there is sulphur in the well formation fluid, the sulphur may react with the bromine and produce corrosive compounds (such as HBr). However, such compounds may still have utility where the solvent is not being used in oil and gas operations or where hydrogen sulphide is not present.

The inventors have also found, unexpectedly, that dibromodifluoromethane can assist in causing asphaltene precipitation in some reservoir fluids. It is believed that this is due to the presence of the fluorine in the halocarbon. This is surprising because the halogen analog carbon tetrachloride is compatible with most reservoirs, as is dibromomethane. The precipitation of asphaltenes can be very damaging to formations, and thus it is believed that use of fluorinated hydrocarbons is not in general desirable.

In wells with low downhole pressures, the composition of the present invention has particular utility in that heavy fluids cannot be used. However, a mixture of condensate and brominated hydrocarbon may be readily prepared that has low density.

The composition of the present invention also helps to reduce the viscosity of vegetable oil formation compatible oil and gas well site operation fluids. Mixtures of less than 5% halogenated hydrocarbon by volume in the vegetable oil can give the vegetable oil desirable viscosity.

The composition of the present invention may also be used to fire retard operation fluids during transportation and storage.

It will be understood that not all operation fluids will be compatible with every well, so that care must be taken to select the appropriate mixture of operation fluids and brominated hydrocarbons for the well of concern.

The brominated hydrocarbons noted here, particularly dibromomethane and chlorobromomethane, or mixtures of them, may also be used to fire retard solvents, particularly hydrocarbon solvents that are derived from petroleum refining such as aromatics and naphthalenes. These are also useful frac fluids. For example, in the case of VARSOL ™, a variable composition of aromatics, naphthalenes and chain saturates, addition of less than 1% dibromomethane and chlorobromomethane in a mixture is believed to be sufficient for fire retardance. Similarly, such a low percentage of brominated hydrocarbon mixed with diesel, or another fluid petroleum distillate cut above about 100° C., is believed to provide good fire retardancy. A combination of dibromomethane and chlorobromomethane is also believed to be useful when used in combination since the dibromomethane boils at 98° C. and the chlorobromomethane, since it boils at 66° C., this reduces the average boiling point of the additive. In the case of the use of the organic solvent as a commercial or consumer solvent, then fluorinated hydrocarbons may be used such as dibromodifluoromethane (b.p. 22°-23° C.), dibromodifluoroethane (s.g.2.224), 1,2,dibromo-1,1-difluoroethane (b.p. 93°-94° C.), chlorodibromofluoromethane (b.p. 79°-80° C.) and 1,2dibromotetrafluoroethane (s.g.2.175, b.p. 47° C.).

Useful commercial solvents in which the brominated hydrocarbons are believed to be miscible and to produce good fire retardancy include acetone, amyl acetate, amyl alcohol, n-amylamine, n-amylbenzene, n-amylchloride, benzene, benzyl chloride, bromoform, bromo-m-xylene, o-bromotoluene, n-butane, butanol, carbon tetrachloride, chloroform, cumene, naphthene, cyclohexane, dimethyl ether, dipentene, ethane, ethanol, ethylbenzene, ethyl bromide, ethyl chloride, ethylene, ethylene dibromide, ethylene dichloride, ethylene glycol monoethyl, ethyl ether, n-hexane, isopropanol, isopropyl ether, methane, methanol, methylcyclohexane, methyl formate, naphthalene, acetone, pentachloroethane, pentane, perchloroethylene, phenol, phenyl methyl ether, propane, propanol, toluene and xylene.

EXAMPLES

Tests conducted on diesel and other organic solvents (diesel, San Frac Oil, Arosol HTU available from Gulf Oil, Calgary, Canada, FRACOIL 200, SUPERFRAC OIL and BP PC condensate, available from British petroleum, Calgary, Canada) with various combinations of brominated hydrocarbons ($CF_2Br_2$ and $CH_2Br_2$) showed good solubility of the additive in the organic solvent, and compatibility with current gellation processes. Flash points tests showed flash points of various mixtures of organic solvents with brominated hydrocarbons of the invention as shown in the following table (percentages are volume percentages):

| FLUID | FLASH PT ASTM D-93 | | FIRE PT ASTM D-92 |
|---|---|---|---|
| DIESEL (NO ADDITIVE) | 45 | | 63 |
| DIESEL + 2.5% $CH_2Br_2$ | 48 | | 108 |
| DIESEL + 1% $CF_2Br_2$ + 2% $CH_2Br_2$ | >100 | | 130 |
| DIESEL + 2% $CF_2Br_2$ + 1% $CH_2Br_2$ | >100 | | 130 |
| DIESEL + .5% $CF_2Br_2$ + .5% $CH_2Br_2$ | >100 | | 83 |
| DIESEL + 1% $CH_2Br_2$ + 1% $CH_2BrCl$ | >100 | | |
| DIESEL + .5% $CH_2Br_2$ + .5% $CH_2BrCl$ | >100 | | |
| DIESEL + 2.5% $CH_2Br_2$ + 2.5% $CH_2BrCl$ | >100 | | |
| TURPENTINE | 36 | (56) | 56 |
| TURPENTINE + 5% $CH_2Br_2$ | >100 | (60) | 99 |
| TURPENTINE + 5% $CF_2Br_2$ | >100 | (61) | 63 |
| TURPENTINE + 2.5% $CH_2Br_2$ + 2.5% $CF_2Br_2$ | >100 | (60) | 62 |
| VARSOL ™ | 46 | | 55 |
| VARSOL ™ + 5% $CH_2Br_2$ | >100 | (58) | 77 |
| VARSOL ™ + 5% $CF_2Br_2$ | >100 | (67) | 81 |
| VARSOL ™ + 2.5% $CH_2Br_2$ + 2.5% $CF_2Br_2$ | >100 | (65) | 74 |
| PAINT THINNER (P.T.) | 46 | | 52 |
| P.T. + 5% $CH_2Br_2$ | >100 | (61) | 75 |
| P.T. + 5% $CF_2Br_2$ | >100 | (60) | 72 |
| P.T. + 2.5% $CH_2Br_2$ + 2.5% $CF_2Br_2$ | >100 | (61) | 82 |
| TOLUENE | 8 | (11) | 17 |
| TOLUENE + 5% $CH_2Br_2$ | 10 | (24) | 60 |
| TOLUENE + 5% $CF_2Br_2$ | N/A | (23) | 40 |
| TOLUENE + 2.5% $CH_2Br_2$ + 2.5% $CF_2Br_2$ | N/A | (24) | 40 |
| XYLENE | 25 | (34) | 38 |
| XYLENE + 5% $CH_2Br_2$ | 29 | (39) | 80 |
| XYLENE + 5% $CF_2Br_2$ | >100 | (45) | 71 |
| XYLENE + 2.5% $CH_2Br_2$ + 2.5% $CF_2Br_2$ | >100 | (39) | 70 |
| METHANOL | 12 | (19) | 19 |
| METHANOL + 5% $CH_2Br_2$ | 10 | (20) | 20 |
| METHANOL + 5% $CF_2Br_2$ | N/A | (29) | 29 |
| METHANOL + 2.5% $CH_2Br_2$ + 2.5% $CF_2Br_2$ | N/A | (21) | 21 |
| 1-PROPANOL | 24 | | 28 |
| 1-PROPANOL + 5% $CH_2Br_2$ | 28 | | 36 |
| 1-PROPANOL + 2.5% $CH_2Br_2$ + 2.5% $CH_2BrCl$ | 28 | | 36 |
| 1-PROPANOL + 5% $CH_2BrCl$ | 32 | | 40 |
| 1-PROPANOL + 5% $CF_2Br_2$ | N/A | | 37 |
| 1-PROPANOL + 2.5% $CH_2Br_2$ + 2.5% $CF_2Br_2$ | N/A | | 41 |
| SUNDRE CONDENSATE 107° C. Cut | 27 | | |
| CONDENSATE + 0.5% $CH_2Br_2$ | 28 | | |
| CONDENSATE + 1.0% $CH_2Br_2$ | 28 | | |
| CONDENSATE + 1.5% $CH_2Br_2$ | 29 | | |
| CONDENSATE + 2.0% $CH_2Br_2$ | 29 | | |
| CONDENSATE + 2.5% $CH_2Br_2$ | 29 | | |
| CONDENSATE + 0.5% $CH_2BrCl$ | 28 | | |
| CONDENSATE + 1.5% $CH_2BrCl$ | 29 | | |
| CONDENSATE + 0.75% $CH_2Br_2$ + 0.75% $CH_2BrCl$ | 27 | | |
| SUNDRE CONDENSATE 120° C. Cut | 34.2 | | |
| CONDENSATE + 0.5% $CH_2Br_2$ | 35.6 | | |
| CONDENSATE + 0.5% $CH_2BrCl$ | 35.2 | | |
| CONDENSATE + 0.25% $CH_2Br_2$ + 0.25% $CH_2BrCl$ | 36.3 | | |
| CONDENSATE + 1% $CH_2Br_2$ | 36.6 | | |
| CONDENSATE + 1% $CH_2BrCl$ | 35.2 | | |
| CONDENSATE + 0.5% $CH_2Br_2$ + 0.5% $CH_2BrCl$ | 38.3 | | |
| CONDENSATE + 1.5% $CH_2Br_2$ | 41.7 | | |
| CONDENSATE + 1.5% $CH_2BrCl$ | 46.2 | | |
| CONDENSATE + 0.75% $CH_2Br_2$ + 0.75% $CH_2BrCl$ | 42.3 | | |
| CONDENSATE + 2% $CH_2Br_2$ | 44.7 | | |
| CONDENSATE + 2% $CH_2BrCl$ | 48.2 | | |
| CONDENSATE + 1% $CH_2Br_2$ + 1% $CH_2BrCl$ | 44.3 | | |
| CONDENSATE + 2.5% $CH_2Br_2$ | 54.2 | | |
| CONDENSATE + 2.5% $CH_2BrCl$ | 56.2 | | |
| CONDENSATE + 1.25% $CH_2Br_2$ + 1.25% $CH_2BrCl$ | DNF | | |
| SUNDRE CONDENSATE 140° C. Cut | 64 | | |
| CONDENSATE + 0.5% $CH_2Br_2$ | 69 | | |
| CONDENSATE + 1.0% $CH_2Br_2$ | 81 | | |
| CONDENSATE + 1.5% $CH_2Br_2$ | DNF | | |
| CONDENSATE + 2.0% $CH_2Br_2$ | DNF | | |
| CONDENSATE + 0.25% $CH_2Br_2$ + 0.25% $CH_2BrCl$ | 67 | | |
| CONDENSATE + 0.5% $CH_2Br_2$ + 0.5% $CH_2BrCl$ | 82 | | |
| CONDENSATE + 0.75% $CH_2Br_2$ + 0.75% $CH_2BrCl$ | DNF | | |
| ESSO DIESEL | 70 | | |
| ESSO DIESEL + 0.5% $CH_2Br_2$ | 71 | | |
| ESSO DIESEL + 1% $CH_2Br_2$ | 81 | | |
| ESSO DIESEL + 1.5% $CH_2Br_2$ | DNF | | |
| ESSO DIESEL + 2.0% $CH_2Br_2$ | DNF | | |
| ESSO DIESEL + 0.5% $CH_2BrCl$ | 74 | | |
| ESSO DIESEL + 1.0% $CH_2BrCl$ | 80 | | |
| ESSO DIESEL + 1.5% $CH_2BrCl$ | DNF | | |
| ESSO DIESEL + 2.0% $CH_2BrCl$ | DNF | | |
| ESSO DIESEL + 0.25% $CH_2Br_2$ + 0.25% $CH_2BrCl$ | 77 | | |
| ESSO DIESEL + 0.5% $CH_2Br_2$ + 0.5% $CH_2BrCl$ | DNF | | |
| ESSO DIESEL + 0.75% $CH_2Br_2$ + 0.75% $CH_2BrCl$ | DNF | | |
| ESSO DIESEL + 1.0% $CH_2Br_2$ + 1.0% $CH_2BrCl$ | DNF | | |
| PETRO-CANADA DIESEL (PC DIESEL) | 65 | | |
| PC DIESEL + 0.5% $CH_2Br_2$ | 69 | | |
| PC DIESEL + 1% $CH_2Br_2$ | 73 | | |
| PC DIESEL + 1.5% $CH_2Br_2$ | DNF | | |
| PC DIESEL + 2.0% $CH_2Br_2$ | DNF | | |
| PC DIESEL + 0.5% $CH_2BrCl$ | 66 | | |
| PC DIESEL + 1.0% $CH_2BrCl$ | 89 | | |
| PC DIESEL + 1.5% $CH_2BrCl$ | DNF | | |
| PC DIESEL + 2.0% $CH_2BrCl$ | DNF | | |
| PC DIESEL + 0.25% $CH_2Br_2$ + 0.25% $CH_2BrCl$ | 71 | | |
| PC DIESEL + 0.5% $CH_2Br_2$ + 0.5% $CH_2BrCl$ | 69 | | |
| PC DIESEL + 0.75% $CH_2Br_2$ + 0.75% $CH_2BrCl$ | DNF | | |
| PC DIESEL + 1.0% $CH_2Br_2$ + 1.0% $CH_2BrCl$ | DNF | | |

The middle column of numbers in parentheses indicates the open cup flash point while the first column gives the Pensky-Martin closed cup flash point. N/A means that no flash would occur in the cup due to spitting, and hence ignition could not be observed, but it would flash outside the cup. DNF means that no flash was observed.

The Esso Diesel was obtained from a commercial gas station in Alberta, Canada, operated by Esso Canada. The Petro-Canada Diesel was obtained from a commercial bulk depot in Alberta, Canada, operated by Petro-Canada. The turpentine, VARSOL ™ and paint thinner were obtained from a consumer goods store in Calgary, Alberta, Canada.

For the Sundre condensate, although only a small increase in flash point was observed for the small concentrations of brominated hydrocarbon additive used, the additive modified the reaction of the vapours to the flame used in the tests. Untreated samples would flash quite violently, and would continue to flash as the temperature was raised past the initial flash point. The presence of any of the additives would lower the combustibility of the vapours noticeably. At 0.5% additive, the strength of the flash would decrease as would the number of flashes after the flash point. Non-standard flame point tests showed erratic results, with sometimes lower values for the untreated condensate, believed to be due to the condensate being so volatile it was blowing the flame out. Solubility of the additive in the condensate 140° C. cut also appeared reduced, but not so reduced to be of concern. Not all brominated hydrocarbons will apparently work as a fire retardant for an organic solvent composition, since they show no increase in flash point when added in small quantities to the composition. A test with pentabromodiphenyl ether showed 70° C. flash point when added to Esso Diesel (1% additive), 27° C. flash point when added to 107° C. Condensate (2% additive) and 63° C. when added to 140° C. Condensate (2% additive). Also, the flash of the treated additive behaved identically to the untreated additive. The additive took a long time to dissolve in the samples due to its high viscosity.

On the other hand, flame propagation tests show that addition of small quantities of dibromomethane, bromochloromethane or a mixture of the two to flammable hydrocarbons would delay the onset of flame propagation and slow the flame propagation. The tests were carried out with a propagation trough 80 cm long, about 1 cm deep and 8 cm wide. A wick was placed at one end of the trough, and the testing was initiated with an attempt to light the wick with a flame.

For ESSO untreated diesel, flame propagation began at 31 sec. and reached the end of the trough at 1 min. 4 sec., whereas for the same diesel with 1% $CH_2Br_2$, the corresponding figures were 3 min. and 4 min. 5 sec., and for diesel with 1.5% $CH_2Br_2$, the flame did not propagate at all. Hence, it was found that for even small quantities of fire retardant additive, where only a small increase in the flash point was observed, there was a marked reduction in flame propagation rate.

In general, it was found that during flame propagation tests, the treated samples were more difficult to light and the flame propagated more slowly. On average the following propagation speeds were observed (for a condensate 110° C. cut):

| Additive concentration | Speed of propagation |
| --- | --- |
| 0% | 8 cm/sec |
| 0.5% | 4 cm/sec |
| 1% | 2.7 cm/sec |
| 1.5% | 2 cm/sec |

For toluene (b.p. 110° C., flash point 4° C.), addition of 1.5% $CH_2Br_2$ or 1.5% $CH_2BrCl$ or a 1.5% mixture of the two did not affect ease of ignition or flame propagation. However, with 5% $CH_2Br_2$, the flame propagation time (therefore a reduction in the flame propagation rate) was increased from 1 second to 14 seconds, and with 5% $CH_2BrCl$, the flame propagation time was increased from 1 second to 21 seconds as compared with the untreated toluene.

For xylene (b.p. 136°-142° C., flash point 29° C.), during flame propagation tests at 25° C., the untreated xylene was hard to ignite, began propagating at 9 seconds after ignition and propagated to the end in an additional 17 seconds. For xylene with 1.5% $CH_2Br_2$, the mixture was extremely hard to ignite and did not continue burning when the flame was taken away. For xylene with 1.5% $CH_2BrCl$, the mixture was extremely hard to ignite, propagation began in 25 seconds after ignition and the flame propagated to the end of the trough in an additional 29 seconds. For a 1.5% mixture of the two additives, the mixture was again extremely hard to ignite, started propagating at 4 seconds, and took an additional 25 seconds to propagate to the end of the trough. For VARSOL ™ at 25° C., the untreated composition was easy to ignite, took 294 seconds to propagate and travelled to the end of the trough in an additional 33 seconds. For VARSOL ™ with 1.5% $CH_2BR_2$ and for VARSOL ™ with 1.5% $CH_2BrCl$, the composition did not light, and with a 1.5% mixture of the two additives, the composition was extremely hard to ignite and would not propagate. Easy to ignite means that the wick would light at first or second touch of a torch on the wick. Hard to ignite means that many attempts are required to light the wick but the wick keeps burning once lit. Extremely hard to ignite means that the wick does not catch fire until the torch is held on for extended periods (up to 60 seconds), possibly requiring more than one try to light the wick.

A person skilled in the art could make immaterial modifications to the invention described and claimed in this patent without departing from the essence of the invention.

We claim:

1. A fire retarded solvent composition for use as an oil and gas operation fluid, the composition comprising:
    a mixture of at least one well formation compatible flammable or combustible organic solvent; and
    at least one non-flourine containing brominated non-aromatic hydrocarbon dissolved in the organic solvent in an amount sufficient to cause a decrease in the flame propagation rate of the composition said brominated non-aromatic hydrocarbon being present in an amount of no more than about 5% by volume of said organic solvent.

2. The fire retarded solvent composition of claim 1 in which the mixture of at least one organic solvent includes a mixture of at least one alcohol.

3. The fire retarded solvent composition of claim 1 in which the mixture of at least one brominated hydrocarbon is selected from the group consisting of dibromoethane, dibromomethane, chlorodibromomethane, bromochloromethane and 1,2dibromoethylene.

4. The fire retarded solvent composition of claim 3 in which the mixture of at least one organic solvent is selected from the group consisting of light petroleum distillate, diesel and crude, the organic solvent primarily having between 5 and 12 carbon atoms.

5. The fire retarded solvent composition of claim 4 in which the mixture of at least one organic solvent is a light petroleum distillate having primarily between 5 and 12 carbon atoms.

6. The fire retarded solvent composition of claim 5 in which the organic solvent includes at least 30% by volume of aromatics.

7. The fire retarded solvent composition of claim 1 in which the mixture of at least one brominated non-aromatic hydrocarbon is in an amount no greater than 1.5% by volume of the solvent composition.

8. The fire retarded solvent composition of claim 7 in which the mixture of at least one brominated non-aromatic hydrocarbon is selected from the group consisting of dibromomethane and bromochloromethane.

9. The fire retarded solvent composition of claim 8 in which the organic solvent includes at least 30% aromatics by volume.

10. A fire retarded solvent composition for use as an industrial or household solvent, the composition comprising:
a mixture of at least one flammable organic solvent; and
at least one brominated non-aromatic hydrocarbon dissolved in the organic solvent in an amount sufficient to cause a decrease in the flame propagation rate of the composition said brominated non-aromatic hydrocarbon being present in an amount of no more than about 5% by volume of said organic solvent.

11. The fire retarded solvent composition of claim 10 in which the at least one brominated non-aromatic hydrocarbon is selected form the group consisting of dibromoethane, dibromomethane, chlorodibromomethane, bromochloromethane, dibromodifluoromethane, dibromodifluoroethane, 1,2dibromo-1.1-difluoroethane, chlorodibromofluoromethane, 1,2dibromotetrafluoroethane and 1,2dibromoethylene.

12. The fire retarded solvent composition of claim 11 in which the organic solvent is selected from the group consisting of light petroleum distillate, diesel and crude, the organic solvent primarily having between 5 and 12 carbon atoms.

13. The fire retarded solvent composition of claim 12 in which the at least one brominated non-aromatic hydrocarbon is in an amount no greater than 1.5% by volume.

* * * * *

UNITED STATES PATENT AND TRADEMARK OFFICE
CERTIFICATE OF CORRECTION

PATENT NO. : 5,207,953
DATED : May 4, 1993
INVENTOR(S) : D.A. Thorssen, et al

It is certified that error appears in the above-indentified patent and that said Letters Patent is hereby corrected as shown below:

On the title page, Item [56] Other Publications, line 1, "purusant" should read --pursuant--.

Column 7, line 26, after "concern." begin a new paragraph with the sentence "Not all..."

Column 8, line 49, "non-flourine" should read --non-florine--

Column 10, line 10, "form" should read --from--.

Signed and Sealed this

Eighth Day of February, 1994

Attest:

BRUCE LEHMAN

*Attesting Officer*  *Commissioner of Patents and Trademarks*